(12) United States Patent
Pearson et al.

(10) Patent No.: US 11,991,590 B2
(45) Date of Patent: May 21, 2024

(54) VEHICULAR BACK-UP CAMERA SYSTEM

(71) Applicant: Enterprise Electronics LLC, Madison Heights, MI (US)

(72) Inventors: David J. Pearson, Bruce Township, MI (US); Jeff Vogel, Troy, MI (US); Benson Brady, Detroit, MI (US); Jeffrey Allan Makelim, North Canton, MI (US)

(73) Assignee: Enterprise Electronic LLC, Madison Heights, MI (US)

( * ) Notice: Subject to any disclaimer, the term of this patent is extended or adjusted under 35 U.S.C. 154(b) by 382 days.

(21) Appl. No.: 16/525,657

(22) Filed: Jul. 30, 2019

(65) Prior Publication Data

US 2021/0031686 A1 Feb. 4, 2021

(51) Int. Cl.
*H04W 4/029* (2018.01)
*B60Q 1/00* (2006.01)
(Continued)

(52) U.S. Cl.
CPC .......... *H04W 4/029* (2018.02); *B60Q 1/0017* (2013.01); *B60Q 1/525* (2013.01); *B60Q 5/005* (2013.01); *B60R 1/26* (2022.01); *B60R 11/04* (2013.01); *B62D 41/00* (2013.01); *G06T 7/20* (2013.01); *G07C 5/008* (2013.01); *H04N 23/51* (2023.01); *H04N 23/54* (2023.01); *B60R 2011/004* (2013.01); *B60R 16/033* (2013.01);
(Continued)

(58) Field of Classification Search
CPC ...... B60Q 5/005; B60Q 1/525; B60Q 1/0017; H04N 5/2253; H04N 5/2252; B62D 41/00; G07C 5/008; B60R 11/04; B60R 2011/004; B60R 2300/101; B60R 2300/406; B60R 2300/103; B60R 2300/50; B60R 2300/302; B60R 16/033; B60R 2300/8093; B60R 1/00; G06T 7/20; G06T 2207/10016; G06T 2207/30252; G06T 7/11; H04W 4/029; G05D 1/0246; G05D 1/0088; G06N 3/08; G06K 9/00805; G06K 9/00798
See application file for complete search history.

(56) References Cited

U.S. PATENT DOCUMENTS 11,099,558 B2 * 8/2021 Huang ................. G02B 27/017
2001/0043142 A1 * 11/2001 Milliken ................. B60Q 1/22
340/463

(Continued)

*Primary Examiner* — Dramos Kalapodas

(57) ABSTRACT

A backup camera system integrates various capabilities in a common housing to deliver enhanced safety and convenience functions for less cost and improved utility. Apparatus such as an inertial measurement unit (IMU) may be used to automatically detect when the vehicle is moving in reverse, such that no signal is required from the vehicle to determine that the vehicle is moving in reverse. The IMU may further detect a crash situation. A sound or light generator may provide an alert to an area surrounding the vehicle. Integrated communications capabilities provide for remote control of various functions and the exchange of signals and information to remote devices facilitating vehicle-to-vehicle, vehicle-to-infrastructure or infrastructure-to-vehicle communications. The system may further integrate proximity detection, imaging and computer-readable code interpretation, and GPS location.

20 Claims, 2 Drawing Sheets

(51) Int. Cl.
*B60Q 1/50* (2006.01)
*B60Q 5/00* (2006.01)
*B60R 1/26* (2022.01)
*B60R 11/04* (2006.01)
*B62D 41/00* (2006.01)
*G06T 7/20* (2017.01)
*G07C 5/00* (2006.01)
*H04N 23/51* (2023.01)
*H04N 23/54* (2023.01)
*B60R 11/00* (2006.01)
*B60R 16/033* (2006.01)

(52) U.S. Cl.
CPC ... *B60R 2300/101* (2013.01); *B60R 2300/103* (2013.01); *B60R 2300/302* (2013.01); *B60R 2300/406* (2013.01); *B60R 2300/50* (2013.01); *B60R 2300/8093* (2013.01); *G06T 2207/10016* (2013.01); *G06T 2207/30252* (2013.01)

(56) References Cited

U.S. PATENT DOCUMENTS

| | | | |
|---|---|---|---|
| 2003/0191568 A1* | 10/2003 | Breed | B60W 40/06 701/36 |
| 2005/0232624 A1* | 10/2005 | Baldwin | G03B 7/26 396/278 |
| 2007/0162257 A1* | 7/2007 | Kostyk | G06Q 30/0201 702/182 |
| 2008/0046150 A1* | 2/2008 | Breed | B60R 21/0134 701/45 |
| 2009/0093928 A1* | 4/2009 | Getman | B60T 8/1708 701/37 |
| 2009/0096870 A1* | 4/2009 | Zheng | B60K 37/06 348/148 |
| 2017/0088072 A1* | 3/2017 | Curtis | G08B 31/00 |
| 2017/0227162 A1* | 8/2017 | Saika | F16M 11/041 |
| 2019/0186153 A1* | 6/2019 | Ohrstrom | E04F 11/1817 |

* cited by examiner

VEHICULAR BACK-UP CAMERA SYSTEM

FIELD OF THE INVENTION

This invention relates generally to vehicular accessories and, in particular, to a rear-mounted back-up camera system that integrates a plurality of other capabilities.

BACKGROUND OF THE INVENTION

Rearview mirrors have been used on vehicles for more than a century. However, rearview mirrors cannot look directly behind a car below the level of the rear window, now do conventional rearview mirrors provide a wide-angle view.

Rear-facing or backup cameras address these shortcomings by expanding the driver's field of vision, particularly below the rear window or trunk level. Rear-facing cameras also increase the ability to see beyond the width of a mirror's image, thereby helping to eliminate blind spots. Backup cameras also allow drivers to park more quickly and safely by giving the driver a much clearer and more accurate view of obstacles behind the car. Most backup systems include a warning sound that lets operators know when they are getting too close to an object.

Because of these and other advantages, on Mar. 31, 2014, the U.S. National Highway Traffic Safety Administration announced that it would require all automobiles sold in the United States built beginning in May, 2018 to include backup cameras. Federal law now requires that all new passenger cars, trucks, vans and other vehicles weighing less than 10,000 pounds be equipped with rearview monitoring technology. In most cases this includes rear-mounted video cameras.

Manufacturers generally install backup cameras in vehicle rear trim pieces such as the bumper, near the license plate, in the trunk lid, or in the tailgate of an SUV or pickup truck. The cameras are usually aimed at a downward angle to provide the best view immediately behind the vehicle. Backup cameras also typically have wide-angle lenses to provide a more comprehensive view compared to what is possible with a rearview mirror. In addition to factory-installed units, after-market backup cameras are also available. With some aftermarket systems, the camera may be mounted in a license-plate frame to ease installation. Other camera systems mount in a rear trim piece or bumper cover. After-market systems may use existing interior display screens, or the unit may come with its own monitor. Many new products also feature wireless backup cameras to eliminate the need to route wires through the interior of the vehicle.

Some automakers now offer a 360-degree or "bird's-eye" view system that fuses images from multiple exterior cameras to create super-wide-angle overhead picture. Side-view cameras are also being introduced to eliminate side-view mirrors. Artificial intelligence (AI) may be introduced to detect and differentiate distant objects, allowing the driver know if the system is detecting another vehicle, a pedestrian, or some other object. Various cameras including rear-facing cameras will also certainly be an integral part of autonomous vehicle designs.

Nevertheless, despite the above advances, newer rear-facing and backup camera designs are concentrating on the image-gathering aspects of the system. However, as rear cameras are becoming pervasive in automobiles, the need remains to integrate other functions in the same integrated package with the rear camera(s) to provide additional capabilities.

SUMMARY OF THE INVENTION

This invention improves upon the prior art by combining backup camera technology with various other capabilities to deliver enhanced safety and convenience functions for less cost and more utility as compared to existing systems.

In the preferred embodiments, a common housing is used to integrate one or more rear-facing cameras in the same package. While such a solution may be factory installed, the system may also be provided as an after-market component that interfaces to the vehicle through wired or wireless connectivity, or a combination of wired and wireless communications.

This application discloses various additional capabilities that may be integrated into the same package, but with the understanding that not all of the functions need be included at the same time. That is, some or all of the additional capabilities may be integrated on an as-need or as-desired basis, with the resulting combination of functional subsystems nevertheless being patently distinct.

Certain embodiments of the invention may integrate, for example, in conjunction with backup camera technology, an audible warning indicator including independent, mechanical or electrical reverse-motion sensing. The system may include panic activation from a remote RF signal, network connection, or external trigger, as through a portable hand-held device such as a smart phone or FOB.

Emergency lighting features may be included, with activation based upon an 'inertia event', remote RF signal, network connection, or external trigger. Such lighting may include stroboscopic effects or color, including color-changing sequences. Disabling or canceling a 'warning event' may also be carried out via remote RF signal or external trigger.

A multi-axis (i.e., 3-axis) accelerometer may be used to measure vehicle pitch angle for theft warning by towing, roll angle to measure side-to-side tilt to indicate unsafe angle for raising dump container. The accelerometer may also be used to detect unsafe angle for use of "bucket trucks" (i.e., cherry pickers).

Various wired and wireless communications capabilities may be integrated into the common housing, including two-way audio communication between an external RF device and the vehicular back-up camera system. Emergency Messaging may also be provided via RF signal or network connection due to an 'inertia event' or other condition. Vehicle to Vehicle (V2V), Vehicle to Infrastructure (V2I), and Infrastructure to Vehicle (I2V) network communications may be supported from locally or remotely triggered events. Location-based events may use a global positioning satellite (GPS) system and a networked communication channel to transmit data used by Emergency First Responders.

In addition to safety features, the invention may address various convenience and/or reliability concerns. For example, convenience lighting features may be activated upon receipt of a remote RF signal, network connection, or external trigger. Proximity awareness may be achieved using motion sensing, i.e., PIR, microwave, or camera-image and reporting via radio communications, network communications, or and/or logical Input/Output.

An integrated image processing subsystem may enable visual features such as barcode scanning, scene detection for reverse sensing, object detection, subject identification, and digital video recording. The system may be powered via a replenishable energy source during an 'inertia event,' if needed.

DETAILED DESCRIPTION OF THE PREFERRED EMBODIMENTS

Figure 1:
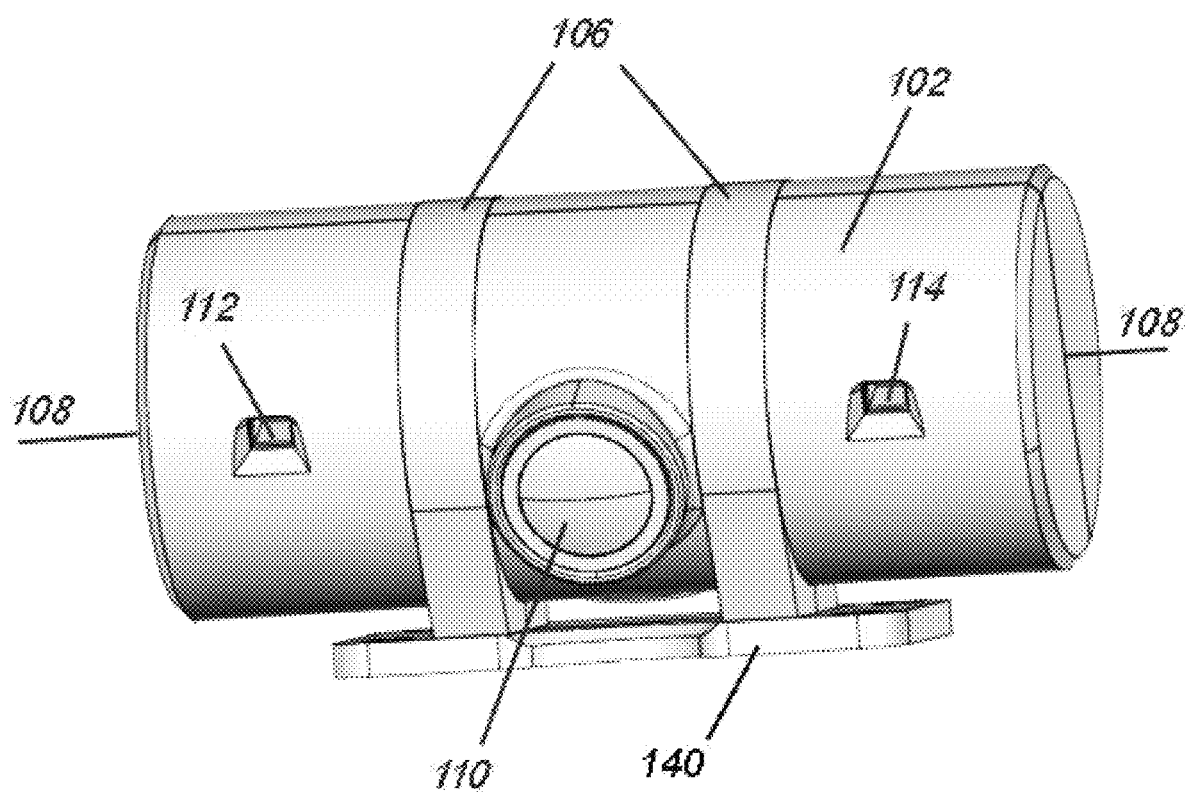
FIG. 1 is an oblique drawing of a possible rear-mounted, back-up camera enclosure according to the invention.

Now making reference to the accompanying drawings, FIG. 1 depicts an enclosure suitable for the invention. The enclosure provides a universal mechanical package with openings for audible communication and exterior lighting preferably based upon optional multicolor illumination and an acoustic chamber. The embodiment shown includes a housing 102 with a mounting bracket 104 enabling the housing to be installed onto the rear of a vehicle such as a bumper or top of vehicle rear. It will be appreciated the other shapes of enclosures may be used in conjunction with other mounting arrangements to suit other locations.

The housing 102 is preferably constructed from a rigid, durable material such as metal or hard plastics, with appropriate seals to provide for weather-proofing. If metal is used, it is either a rust-resistant material such as aluminum or stainless steel, or painted or coated to resist oxidation.

The mounting bracket 104 may facilitate pre-configured mounting angles, including one or more structures 106 enabling the housing 102 to rotate about axis 108 so as to aim a central camera (behind cover 110) and/or lights/sensors 112, 114. Note that other mounting arrangements are possible to facilitate panning as well as the tilting capability shown. Cover 110 may automatically open and close to protect the wide-angle lens during periods of non-use.

Figure 2:
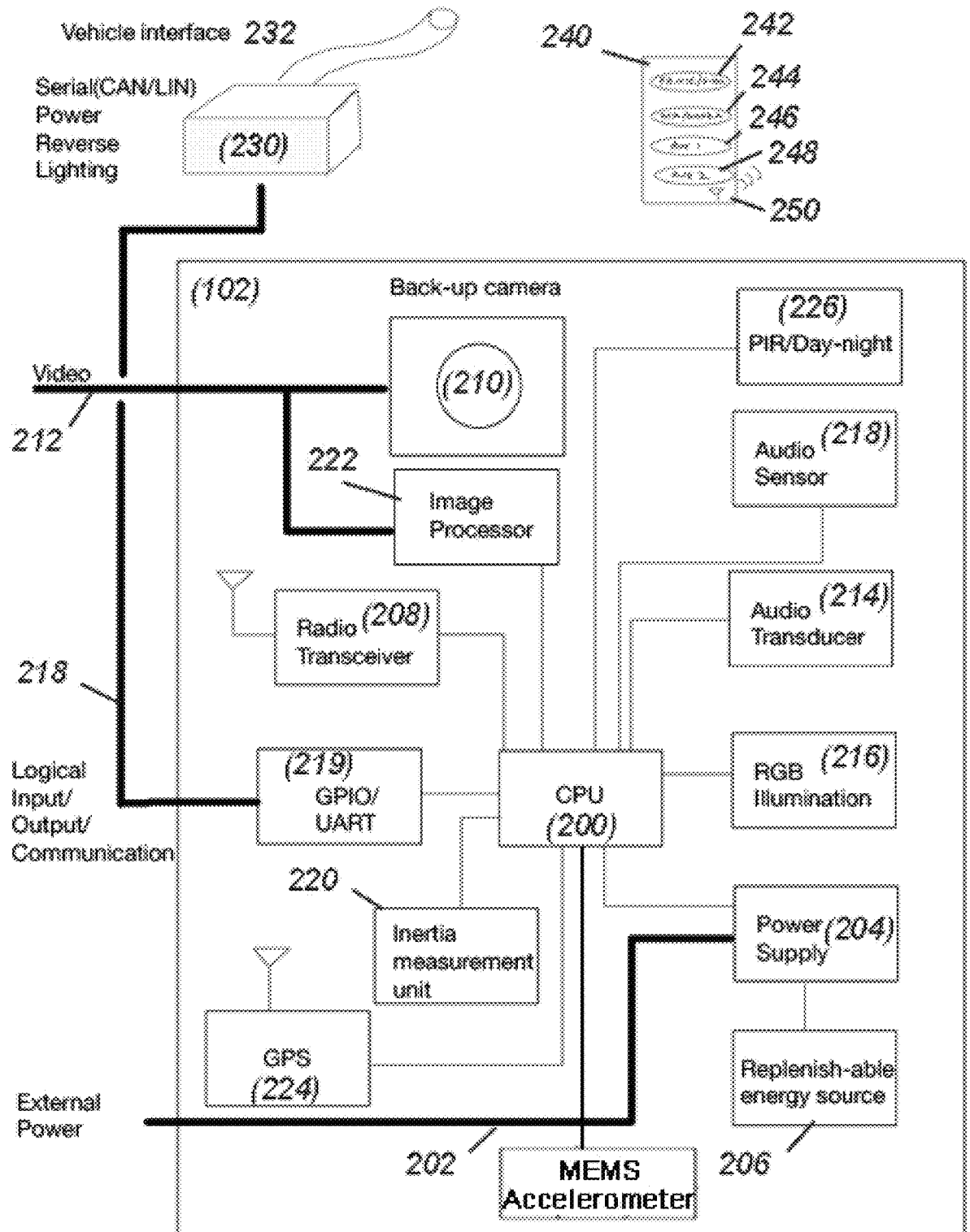
FIG. 2 is block diagram of a preferred embodiment of the invention showing various functional modules.

FIG. 2 is block diagram of a preferred embodiment of the invention showing various functional modules. Overall control is provided by a central-processing unit (CPU) 200 which may be of conventional or proprietary design. The device 200 is preferably a single-chip microcomputer including on-board memory including programmed instructions to carry out at least the functions disclosed herein. One of skill in the art will understand how software would be written to provide these programmed instructions. The CPU 200, as well as the other circuits to be described, may be selected to operate in the automotive temperature range; namely, −40° C. to 125° C.

Power is provided to the various electronic modules via external power line 202, which feeds power supply 204. Power supply 204 may, for example, receive 12 volts from the vehicle and provide other voltages such as 5 volts or 3.3 volts to power the electronics. The power supply 204 may also recharge a replenish-able power source 206 to provide emergency power in the event of a power loss over line 202. This may be important to operate the audio or visual alarms described in further detail below in case the vehicle's battery is depleted or the vehicle experiences a problem generating power.

In addition to camera 210, the system may further include the following functional modules. As discussed in the Summary of the Invention, the word "may" is used here since different embodiments of the invention may not include all of the modules described. Indeed, the system is intended to be modular enabling the various capabilities to mixed-and-matched for different applications or types of vehicles. These modules may include the following, without limitation:

- 208 Multiple RF Transceivers (ISM i.e., Bluetooth, WiFi, Cellular, Dedicated Short Range Communications (DSRC));
- 220 IMU (Inertia Measurement Unit); Multi-axis MEMS accelerometer
- 214 Audio Transducer;
- 218 Audio Sensor;
- 216 Illumination Source;
- 206 Backup Battery or other replenishable power supply with charging management;
- 219 GPIO (General Purpose Input/Output Interface);
- 226 Passive Infrared Sensor;
- 224 GPS Receiver;
- 222 Image Processing Controller;
- 232 Vehicle Interface; and
- 240 Wireless Remote Transceiver for remote operation.

The functions afforded by each of the subsystems are described in detail below.

Generally speaking, the back-up camera system described herein includes some of the features found with typical, factory-installed back-up cameras. For example, at least one camera in housing deliver a video feed to an operator-viewable monitor that may feature on-screen guidelines such as two parallel lines that help direct the driver into or out of parking spaces. The monitor may also show a middle line to help keep the vehicle centered. The display is preferably a color display, and wherein color of the guidelines may change (i.e., from green to yellow to red as the vehicle approaches an obstruction). The backup camera may also provide a close-up view of a trailer in line with a vehicle's hitch, with line color and/or audible sensors keeping an operator informed as to distance. Combined with the audible warnings described herein, these features can be very useful in preventing back-over type accidents.

As with existing camera systems, when the vehicle is in reverse, the camera is automatically activated, sending a rear-view image to the monitor. In particular, the backup camera sends a mirror image to the monitor so the orientation is correct from the perspective of the driver. The monitor may be mounted anywhere in the driver's field of vision, but more preferably in the center area of the cockpit. Since most newer vehicles have an existing screen for the entertainment system, climate control, navigation and other functions, the existing display may used for the backup camera system in accordance with this invention. Other embodiments may use a portion of the rearview mirror as a monitor, which has the advantage of situating the display where drivers are accustomed to looking when backing up. However, this type of monitor is considerably smaller, and therefore provides a less detailed image.

In addition to standard backup camera functions of the type just described, integrated systems according to the invention provide several additional capabilities. While the camera 210 may be activated directly by the vehicle when the vehicle is placed in reverse via 219 GPIO without necessarily requiring interaction from other subsystems described in FIG. 2, in the preferred embodiments, the system automatically and independently senses when the vehicle is moving in a reverse direction, causing camera 210 to deliver a video signal over line 212 to a monitor supported in the interior of the vehicle, such as the dashboard. Wireless signal connections may alternatively be used.

In addition to the video feed, the system may also generate a warning signal when reverse motion is sensed.

This warning indicator may be audible, generated through audio transducer 214, or visual, using illuminator 216. In the preferred embodiments, both audible and visual indictors are activated. The sound generated by unit 214 is preferably the conventional BEEP-BEEP-BEEP sound used in conjunction with vehicle back-up, though other sounds may be used. The visual indicator is also an intermittent signal such as a flashing light. An RGB illuminator 216 is preferably used to provide warning lights of any color including color-changing warnings.

The sensing of reverse mode may be detected in different ways, and the methods described herein may be combined to ensure reliability. For example, as mentioned above, an external trigger signal may be received from the vehicle over I/O line 218 and decoded via GPIO or serial UART/LIN/CAN 219, indicating that the vehicle is in the reverse gear. However, to obviate the need for an external trigger requirement, the inertial measurement unit (IMU) 220 can be used to sense any rearward motion. As yet a further option, the video frames gather by camera 210 may be analyzed by image processor 222, such that if one or more objects in the scene are becoming progressively larger, for example, this may be taken as a clear indication that the vehicle is in reverse.

The image processing subsystem 222 may also be used for localized analysis within the CPU 200 or off-board object detection and reporting connected to a networked system via Radio Transceiver 208, or digital video recording for security and event capturing. Further, the image detection subsystem can be used for bar-code scanning and 'scene sensing' such as reversing, 'virtual bumper' functions where there is a notification via Radio Transceiver 208 or GPIO/UART 219 and Logical Input/Output/Communication 218, and park assist functions.

Optionally, audio transducer 214 may also be used as a siren to signal for help. Such a siren sound may be triggered by various actions, including a remote key fob 'PANIC' button, or an off board networked device via Radio Transceiver 208 to a phone application that senses a PANIC situation and triggers the PANIC alarm via network or Bluetooth connection. Further, the external trigger can be wired to a signal of an existing security system to sound a PANIC alarm.

As with the other possible uses of audio transducer 214, illuminator 216 may also provide other functions. For example, the RGB illuminator may include multi-colored super-bright LEDs that can be used to cast white light for better visibility by a user in the area that the housing is mounted. Such "convenience lighting" can be controlled via one of the GPIO signals over I/O line 218 or, alternatively, the light 216 may be programmed to respond through an RF key fob or network connected phone app via Bluetooth or WiFi using radio transceiver 208.

In addition to convenience lighting, the light(s) 216 may be triggered in conjunction with an emergency situation, either manually or automatically. The possibilities include at least the following:

Upon collision, the IMU 220 may sense force consistent with a collision and can either flash and strobe different colored lights;

An emergency lighting event can be triggered via RF signal from a remote RF transmitter via radio transceiver 208 to a networked device such as a phone or WiFi hot-spot;

An emergency lighting event can be triggered via networked RF or Bluetooth connection through radio transceiver 208; or An emergency lighting event may be triggered via the GPIO 219 connection 218 from the vehicle or other external system.

Through the use of the on-board RF transceivers, the system can participate in standard vehicle-to-vehicle and vehicle-to-infrastructure transactions such as transmitting the current device speed, acceleration, direction, and location by aggregating GPS, GPIO, and IMU data. Further, the device can receive emergency data from these networks and interact with another networked device to provide notifications. With an on-board PIR sensor, the system can send messages to off board systems or devices via the RF transceivers, WiFi, or Bluetooth to report motion around the device. Further, PIR or other motion detection sensors may be used to detect proximity events to trigger audio alarms, lighting, and messages.

A warning event, such as a collision event, panic event or other emergency or alarm event can be disabled via remote RF signal from a key FOB, or a networked RF signal or Bluetooth signal from a phone application or other networked device, or a cancel signal from the vehicular back-up system's GPIO lines connected to an external system.

The system may further be equipped with an audio sensor 218. This may in turn enable two-way communication with an external RF device such as a traditional 2-way radio, Bluetooth device, cellular device, or other networked device using Voice over IP technologies. Also, the system can employ both the audio sensor 218 and the audio transducer 214 to initiate two way communication with a person outside of the vehicle.

Optional Global Position Satellite (GPS) module 224 provides additional capabilities. For example, through the use of the on-board GPS unit, the system can provide location data to off-board systems through RF communication, networked communication such as cellular or Bluetooth, and V2I systems through Digital Short Range Wireless communication to allow emergency personnel to locate the scene.

Further, through the use of the system's IMU 220, an emergency event can initiate a connection to an external device and/or service to propagate an emergency message, which can include user and application specific information such as serial number, user name, VIN number, GPS location, and event data. Such information would be stored in non-volatile memory in CPU 220 or in a separate device. Video frames gathered by camera 210 may also be stored in the memory on a rolling First-In, Last-Out basis, enabling the system to be used as a "black box" in the event of a collision. Such stored frames may be particularly advantageous in the event of a rear-end collision.

The Vehicle Interface 230, 232 is designed to contain common electrical signals used in most vehicles on the road today. These may include, without limitation, battery power, ground, LIN/CAN communication, and outputs for triggering vehicle loads such as lighting and accessory relays or door, window, trunk, lift gate latch relays, etc.

Wireless Remote Transceiver 240 is a wireless one or two way device using radio frequency communication commonly used for remote access systems in the market, but not to exclude such standard technologies such as Bluetooth or WiFi. Such a device may be in the form of a FOB with antenna 250 including various buttons such as PANIC/e-CALL 242; ARM/DISARM 244; and AUX 246, 248.

The invention claimed is:

1. A backup camera system, comprising:
    a housing including at least one video camera having a field of view;

wherein the housing is adapted for mounting on a rear portion of a vehicle such that the field of view of the video camera includes an area behind the vehicle;

wherein the video camera is configured to generate a video signal representative of the area behind the vehicle and communicate the video signal to a video monitor in an interior portion of the vehicle;

apparatus for sensing when the vehicle is moving in reverse, thereby causing the video camera to deliver the video signal to the monitor and enabling an operator of the vehicle to view the area behind the vehicle when the vehicle is moving in reverse;

wherein the apparatus for sensing when the vehicle is moving in reverse is disposed within the housing and automatically and independently senses when vehicle is moving in reverse such that no signal is required from the vehicle to determine that the vehicle is moving in reverse;

an alarm that is activated when the vehicle is moving in reverse; and wherein the alarm is disposed entirely within the housing.

2. The system of claim 1, wherein the apparatus for sensing when the vehicle is moving in reverse includes an inertial measurement unit (IMU) disposed within the housing to sense rearward motion.

3. The system of claim 1, wherein the apparatus for sensing when the vehicle is moving in reverse includes a processor disposed within the housing for analyzing sequential frames of the video signal.

4. The system of claim 1, wherein the alarm is a sound or light generator disposed entirely within the housing providing an alert that the vehicle is moving in a reverse direction.

5. The system of claim 4, wherein the light generator produces a stroboscopic or color-changing light.

6. The system of claim 4, wherein the sound or light generator is additionally activated by an external, remote source.

7. The system of claim 2, wherein the IMU is operative to detect a collision event associated with the vehicle.

8. The system of claim 7, wherein the detection of the collision event causes the activation of a sound or light generator disposed within the housing.

9. The system of claim 7, wherein the detection of the collision event causes a transmitter disposed within the housing to transmit a wireless signal to a remote receiver.

10. The system of claim 1, further including an RF transceiver disposed within the housing facilitating vehicle-to-vehicle, vehicle-to-infrastructure or infrastructure-to-vehicle communications.

11. The system of claim 10, wherein the communications include one or more of the following:
vehicle speed,
vehicle acceleration,
vehicle direction, and
vehicle location.

12. The system of claim 1, further including a sensor for detecting motion proximate to the housing.

13. The system of claim 12, wherein the sensor for detecting motion proximate to the housing includes an infrared sensor.

14. The system of claim 12, further including wireless communications circuitry for transmitting a signal to a remote receiver in conjunction with the detection of motion proximate to the housing.

15. The system of claim 1, further including an audio sensor disposed within the housing to facilitate two-way communications between a remote device and a person proximate to of the vehicle.

16. The system of claim 1, further including a Global Position Satellite (GPS) receiver disposed within the housing to determine a location of the vehicle and wireless communications circuitry operative to transmit a signal containing information about the vehicle including vehicle location enabling emergency personnel to locate the vehicle.

17. The system of claim 16, wherein the information about the vehicle includes vehicle owner information, vehicle serial number or YIN number.

18. The system of claim 1, further including a memory within the housing for storing video information enabling the housing to be used as a black box in the event of a crash.

19. The system of claim 1, further including a rechargeable battery within the housing for powering the video camera and apparatus for sensing when the vehicle is moving in reverse.

20. The system of claim 1, further including multi-axis accelerometer for detecting angular vehicle position.

* * * * *